(No Model.)  6 Sheets—Sheet 1.

E. G. DORCHESTER.
CARTRIDGE LOADER.

No. 411,590. Patented Sept. 24, 1889.

WITNESSES:

INVENTOR
Edward G. Dorchester
BY
ATTORNEYS (No Model.)  6 Sheets—Sheet 2.

E. G. DORCHESTER.
CARTRIDGE LOADER.

No. 411,590. Patented Sept. 24, 1889.

WITNESSES:

INVENTOR
Edward G. Dorchester
BY
ATTORNEYS (No Model.) 6 Sheets—Sheet 3.
E. G. DORCHESTER.
CARTRIDGE LOADER.

No. 411,590. Patented Sept. 24, 1889.

WITNESSES: INVENTOR
Edward G. Dorchester
BY
ATTORNEYS (No Model.)  E. G. DORCHESTER.  6 Sheets—Sheet 4.
CARTRIDGE LOADER.

No. 411,590.  Patented Sept. 24, 1889.

WITNESSES:  INVENTOR
Edward G. Dorchester
BY
ATTORNEYS (No Model.) 6 Sheets—Sheet 5.
E. G. DORCHESTER.
CARTRIDGE LOADER.
No. 411,590. Patented Sept. 24, 1889.
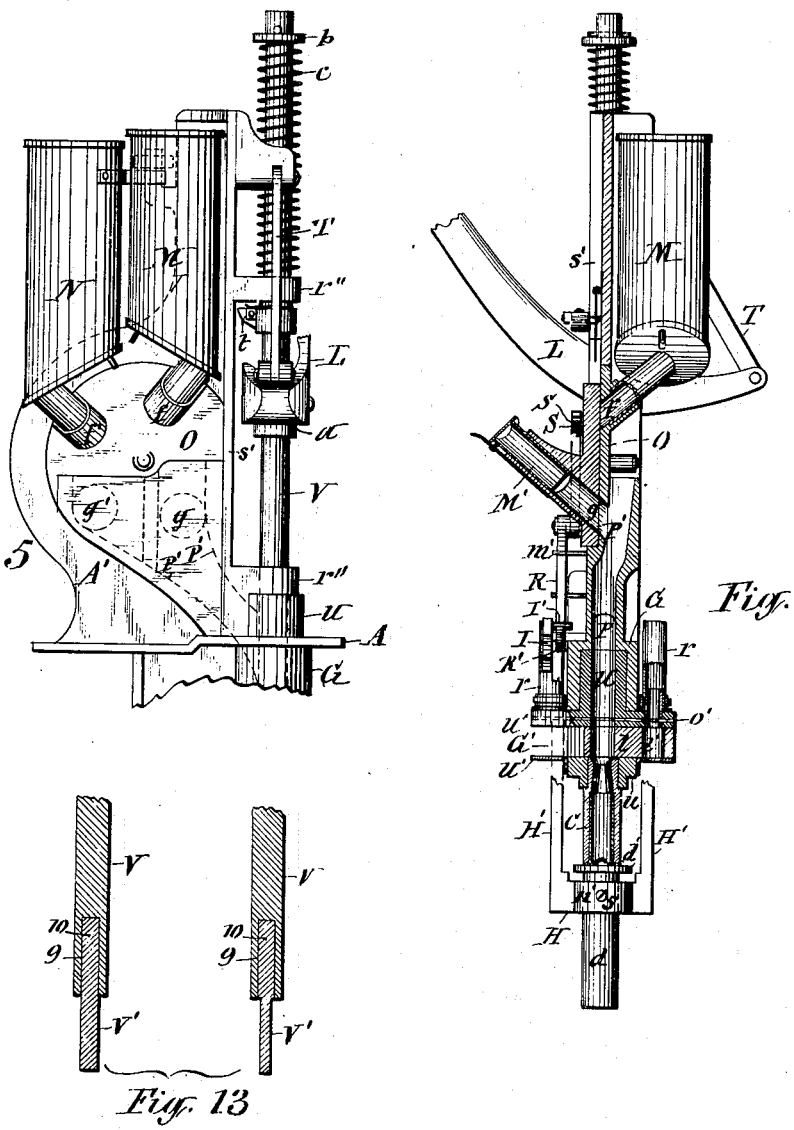
WITNESSES:
INVENTOR
Edward G. Dorchester
BY
Duell, Laass & Duell
ATTORNEYS (No Model.) 6 Sheets—Sheet 6.

E. G. DORCHESTER.
CARTRIDGE LOADER.

No. 411,590. Patented Sept. 24, 1889.

WITNESSES:
C. L. Bendixon
J. J. Laass

INVENTOR
Edward G. Dorchester
BY
Duell, Laass & Duell
ATTORNEYS

UNITED STATES PATENT OFFICE.

EDWARD G. DORCHESTER, OF GENEVA, NEW YORK.

CARTRIDGE-LOADER.

SPECIFICATION forming part of Letters Patent No. 411,590, dated September 24, 1889.

Application filed March 15, 1889. Serial No. 303,438. (No model.)

*To all whom it may concern:*

Be it known that I, EDWARD G. DORCHESTER, of Geneva, in the county of Ontario, in the State of New York, have invented new and useful Improvements in Cartridge-Loaders, of which the following, taken in connection with the accompanying drawings, is a full, clear, and exact description.

This invention is a specific improvement of the cartridge-loader for which I have obtained Letters Patent of the United States No. 387,556, dated August 7, 1888.

The object of my present invention is to adapt the machine for loading cartridges with balls; and to that end the invention consists in the novel construction and combination of parts, as hereinafter described and specifically set forth in the claims.

Figure 1:
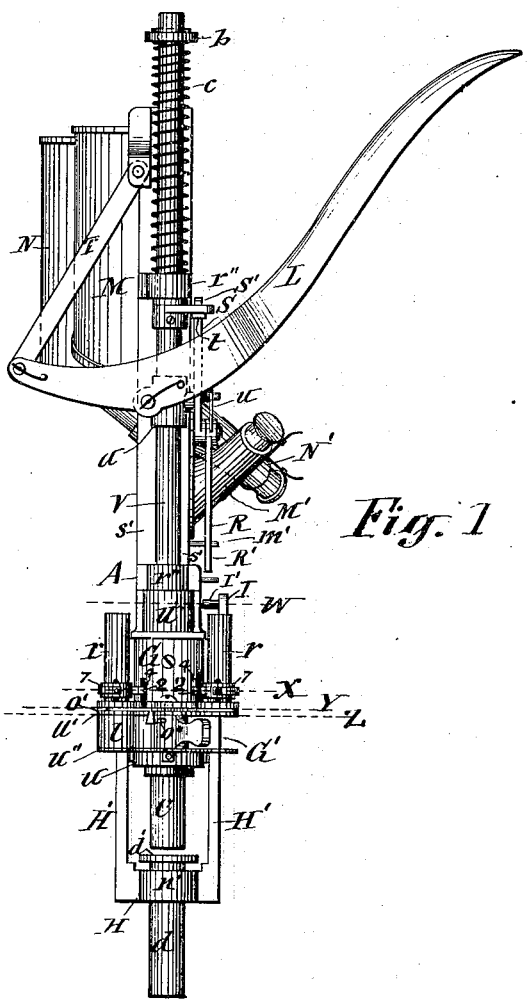
Figure 2:
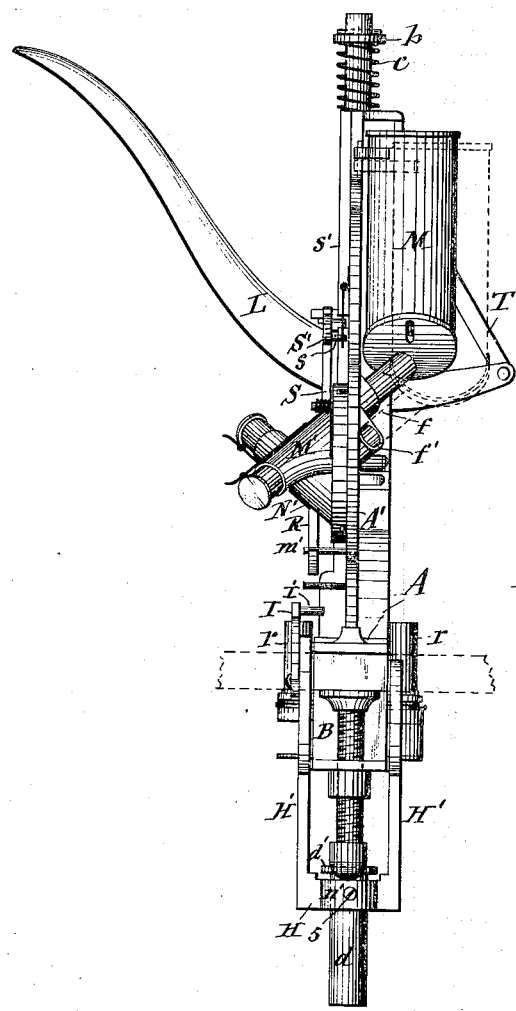
Figure 3:
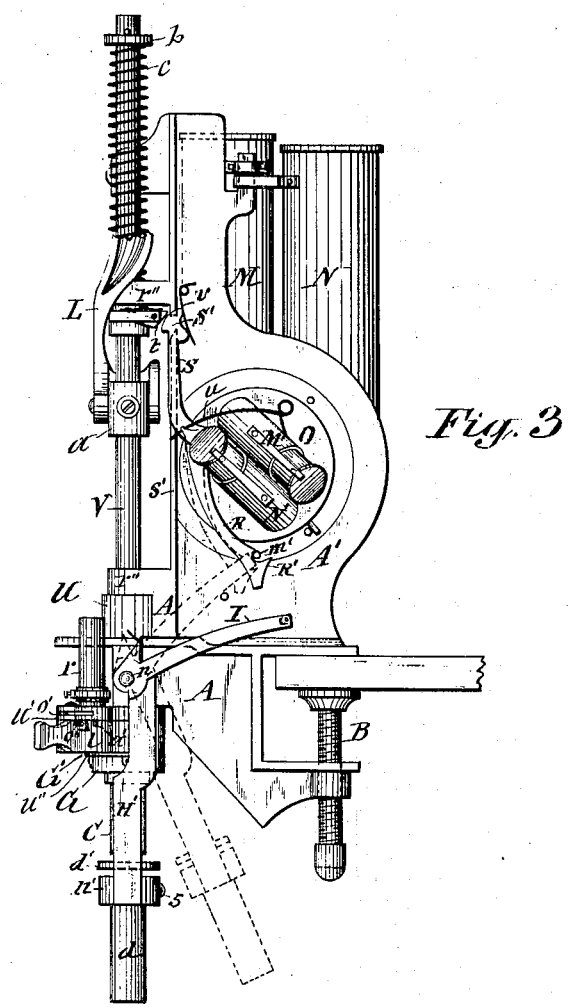
Figure 4:
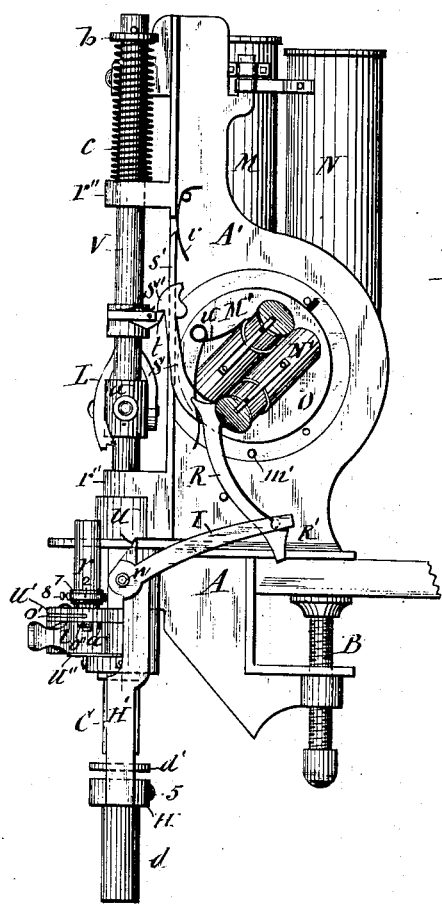
Figure 7:
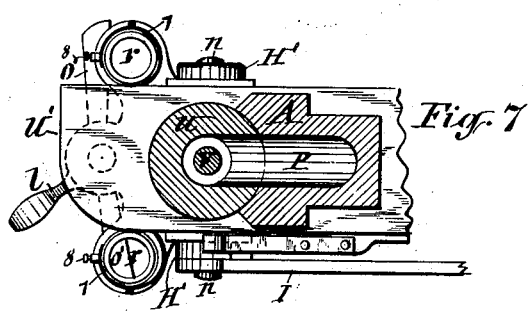
Figure 12:
Figure 11:
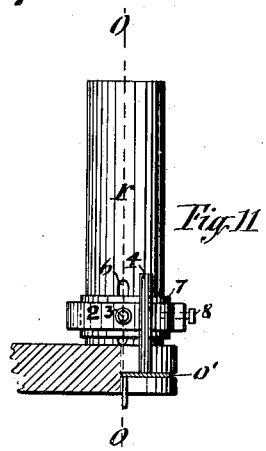
Figure 8:
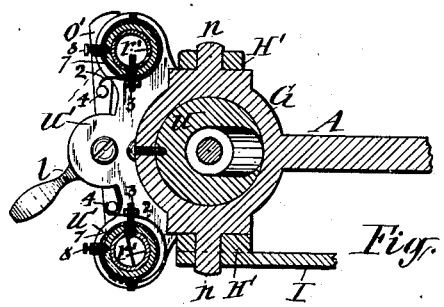
Figure 9:
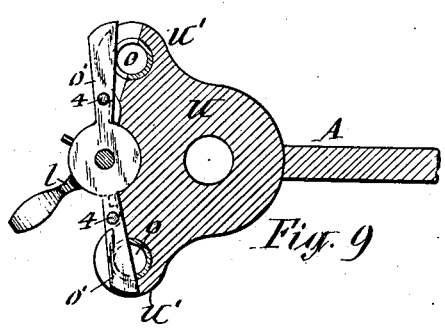
Figure 10:
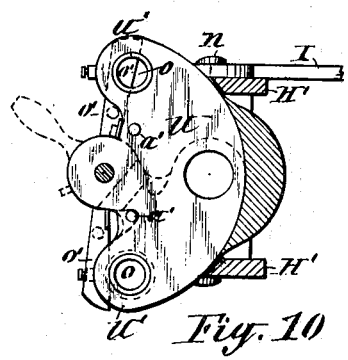

In the accompanying drawings, Figure 1 is a front elevation of my improved cartridge-loader. Fig. 2 is a rear elevation of the same. Figs. 3 and 4 are side elevations showing the machine in different operative positions. Fig. 5 is an elevation of the opposite side of the upper part of the machine. Fig. 6 is a vertical transverse section taken on the lines of the cartridge-receiver and ammunition-ducts. Figs. 7, 8, and 9 are enlarged horizontal transverse sections, respectively, on lines W, X, and Y in Fig. 1. Fig. 10 is an inverted transverse sectional view on line Z Z, Fig. 1. Fig. 11 is a side elevation of one of the ball-reservoirs. Fig. 12 is a vertical transverse section on line O O, Fig. 11. Fig. 13 shows longitudinal sectional views of the interchangeable rammers, and Fig. 14 is a detached plan view of the ball-transferrer.

Similar letters of reference indicate corresponding parts.

A designates the main supporting-frame of the cartridge-loader, provided at its base with the clamp B, by which it is fastened to the edge of the top of a table or other suitable support. The base of said frame is formed with a vertical sleeve G, which is provided with a lateral ammunition-duct P. In said sleeve is secured a tube U, as shown in Fig. 8 of the drawings. This tube is provided with an ammunition duct or inlet coinciding with the duct P, and a short distance above the base of the tube the latter is formed with a horizontal opening G', extending to the front of the machine. To the lower end of said tube is attached the cartridge-receiver C, of the form of a tube adapted to receive the cartridge or shell through its lower end, said cartridge or shell being supported in the receiver C by arms H' H', pivoted to and suspended from trunnions $n$ $n$ on opposite sides of the sleeve G. The lower ends of said arms have secured between them a cross-bar H, which is provided in the center with an eye $n'$, and in this eye is fitted longitudinally adjustably a stem $d$, which is provided on its upper end with a seat $d'$ for the cartridge. A set-screw 5, inserted into the side of the eye $n'$ and engaging the stem $d$, serves to retain the same in its adjusted position, said adjustability being necessary to accommodate cartridges or shells of different lengths. By swinging the arms H' H' into a vertical position the said seat is carried into a position directly under the end of the cartridge in said receiver.

Figure 14:
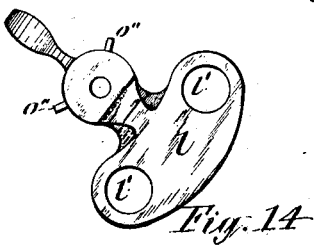

Immediately above and below the opening G the tube U is provided with horizontal projections U' U'' toward the front of the machine, and to the upper projection U' is pivoted the ball-transferrer $l$, which is movable laterally in the opening G and is provided with two vertical channels $l'$ $l'$, as shown in Fig. 14 of the drawings. The upper projection U' is provided at opposite sides of and equidistant from the channel of the tube U with two vertical ports or perforations $o$ $o$, in the upper ends of which are inserted tubular reservoirs $r$ $r$ for balls. The bases of the said reservoirs are provided with horizontal slots, and to the projection U' is pivoted a horizontal gate $o'$, which is adapted to move with its opposite ends alternately into and out of the aforesaid slots of the reservoirs. By means of lugs $o''$ on the transferrer $l$, engaging the gate $o'$, the latter is moved automatically during the latter portion of the movement of the transferrer. The distance between the channels $l'$ $l'$ of the transferrer is equal to the distance between the channel of the tube U and one of the perforations $o$, and therefore when the transferrer $l$ is turned so as to have one of its channels coinciding with that of the tube the other channel of the transferrer coincides with one of the perforations o. From the under side of the projection U' project lugs a', which serve to limit the movement of the transferrer so as to cause the channels to coincide, as aforesaid. Above the gate o' the ball-reservoirs r r are provided with gages consisting of springs 2 2, attached to the exteriors of the reservoirs and having attached to them pins 3 3, which project radially toward slots in the sides of the reservoirs and are held normally out of the reservoirs by the springs. From the gate o' project upward two arms or posts 4 4, which during the movement of the gate press alternately the two springs 2 2 toward the reservoirs r r, and the resultant entrance of the pins 3 3 into reservoirs immediately above the balls at the bottoms thereof serves to support the balls in the upper parts of the reservoirs, while the gate o' moves from under the lower balls to allow the same to drop into the channels l' l' of the transferrer l.

In order to render the gages adjustable to balls of different sizes, I provide the reservoirs each with a vertical slot 6 for the passage of the pin 3 and attach the spring 2 to a collar 7, which is adapted to be shifted vertically on the reservoir and secured in its position by a set-screw 8, as shown in Figs. 7, 8, and 11 of the drawings.

V denotes the ramrod, which slides longitudinally in guides $r''$ $r''$ on the front of the frame A above the sleeve G. A spiral spring c, surrounding the ramrod above the upper guide $r''$ and seated upon the latter and pressing with its upper end against a collar b, firmly attached to the ramrod, serves to sustain the ramrod normally in its elevated position. A lever L is pivoted at one end to a toggle T, connected to the frame, and at a suitable distance from said end the lever is connected to a collar a, attached to the ramrod. By means of this lever the ramrod is forced down into the cartridge held in the receiver C. The back portion of the upper part of the frame A is formed with a broad web A', standing vertically and extending rearward, and this web has transversely through it two sets of ports or channels $f$ $f'$ and $g$ and $g'$, disposed obliquely and respectively in opposite directions. The upper channels $f$ and $f'$ communicate at their upper ends, respectively, with a powder-reservoir M and shot-reservoir N, secured to the frame A, and the lower channels $g$ and $g'$ communicate at their lower ends with the ammunition-duct P', which is formed inside of the frame and is extended to the duct P in the side of the sleeve G, hereinbefore described, the described line of communication being illustrated in Fig. 6 of the drawings and indicated by the dotted lines P' P' in Fig. 5 of the drawings.

To the side of the web A' toward which the upper channels $f$ $f'$ are inclined are pivoted in common the powder and shot gages M' and N', which have their mouths toward the web A' and are disposed inclined and in such relative positions that by turning them on their pivot they can be brought into communication alternately with the upper and lower sets of channels $f$ $f'$ and $g$ $g'$. When turned to communicate with the upper channels $f$ $f'$, the chargers M' N' become charged with ammunition, and when turned to communicate with the lower channels $g$ $g'$ the contents of said chargers are emptied into said channels, from whence they are conducted through the ducts P' P to the cartridge held in the receiver C. For turning the aforesaid chargers automatically I employ mechanisms in some respects similar to those shown in my prior patent hereinbefore referred to—i. e., to the plate O, to which the chargers M' N' are attached, are pivotally connected two arms R S. The arm R extends downward and has its lower end beveled and provided with a hook R', and by means of a spring u, bearing on said arm, the lower end thereof is caused to normally rest against a stop m', attached to the frame A. The other arm S extends upward and has its upper end beveled toward the front of the machine and is formed with a hook S' below the bevel. From the side of said end of the latter arm projects a pin s, by which the arm is made to rest against vertical flange s' on the frame A by means of a spring v.

To the ramrod is pivotally connected a cam t, which is adapted to yield to upward pressure and sustained rigidly against downward pressure, said cam being in the path of the hook S', for the purpose hereinafter explained.

From one of the arms H' is rigidly extended a lever I, which has on its free end a pin I', projecting from the side toward the web A' and adapted to engage the hook R' of the arm R, as hereinafter described.

The operation of the described cartridge-loader for loading with balls is as follows: The shot-reservoir N is left empty and the powder-reservoir M is filled with powder and the ball-reservoirs r r filled with balls. The ramrod in rising to its normal position causes the cam t to draw up with it the arm S by the engagement of said cam with the hook S' of said arm and thereby turns the powder-charger M' into a position to be charged from the powder-reservoir M. By swinging the arms H' H' rearward the cartridge is allowed to be inserted into the receiver C, and by swinging the aforesaid arms forward the seat d' is brought under the base of the cartridge to sustain the same. In the rearward movement of the arms the lever I is caused to engage by its pin I' the hook R' of the arm R, and in swinging the arms H' H' forward the lever I draws down the arm R, and thereby imparts a partial rotation to the chargers M' N', the powder-charger M' being thus inverted and caused to empty its contents into ducts P P', which convey the powder into the cartridge. Then by turning the transferrer l on its pivot the channel l' thereof, which has during the aforesaid operation been under one of the ball-reservoirs r, is brought directly over the cartridge. Then by pressing down the lever I the ramrod V is made to force the ball down into the cartridge. The subsequent ascent of the ramrod restores the powder-charger M' to its position to receive powder from the reservoir M. In turning the ball-transferrer l, as aforesaid, the gate o' is moved to close by one of its ends the perforation o under the ball-reservoir from which the transferrer has been moved and open by the opposite end of the gate the perforation o under the other reservoir r to allow a ball to drop therefrom into the subjacent channel l' of the transferrer. At the same time the arm or post 4 on the latter end of the gate presses the gage-pin 3 into the reservoir r to support the balls in the upper part of said reservoir. The cartridge is removed from the receiver C by swinging the arms H H' rearward and then withdrawing the cartridges.

In order to render the ball-reservoir r and ramrod adjustable in diameter to correspond to different calibers of balls, I provide the said reservoir with a removable reducer or bushing r', as shown in Figs. 8 and 12 of the drawings, and provide the ramrod with lower end sections V' of different diameters, adapted to be interchangeably attached to the ramrod. The attachment of said interchangeable sections I prefer to make by providing the lower end of the main portion of the ramrod with an axial socket 9 and form the aforesaid sections with shanks 10, by which they are inserted in the said socket, to which they are closely fitted, as represented in Fig. 13 of the drawings. If desired to more firmly secure the shank in the socket, said parts may be screw-threaded or a pin or set-screw may be inserted transversely.

Having described my invention, what I claim as new, and desire to secure by Letters Patent, is—

1. In combination with the cartridge-receiver and powder-channel over the same, ball-reservoirs at opposite sides of said channel and a ball-transferrer arranged movably laterally between the cartridge-receiver and the aforesaid channel and reservoirs and provided with passages adapted to communicate alternately with the said parts, as set forth.

2. In combination with the cartridge-receiver, a powder-channel above and in range with said receiver, ball-reservoirs disposed at opposite sides of and equidistant from the powder-channel, and a ball-transferrer arranged movably laterally between said receiver and reservoirs and provided with vertical passages arranged apart at a distance equal to that between the axis of the cartridge-receiver and one of the aforesaid reservoirs, substantially as set forth and shown.

3. In combination with the cartridge-receiver, a powder-channel above and in range with said receiver, ball-reservoirs disposed at opposite sides of and equidistant from the powder-channel, a ball-transferrer arranged movably laterally between said receiver and reservoirs and provided with vertical passages arranged apart a distance equal to that between the axis of the cartridge-receiver and one of the ball-reservoirs, and a gate arranged movably across the bases of the ball-reservoirs, as set forth and shown.

4. In combination with the cartridge-receiver, ball-reservoirs above said receiver and disposed at opposite sides of and equidistant from the axial line thereof, a ball-transferrer arranged movably laterally between said receiver and reservoirs, a gate arranged movably across the bases of the reservoirs, and lugs on the transferrer engaging the gate to move the same automatically, as set forth.

5. In combination with the cartridge-receiver, ball-reservoirs above said receiver and disposed at opposite sides of and equidistant from the axial line of the receiver, a ball-transferrer arranged movably laterally between said receiver and reservoirs, a gate arranged movably across the bases of the reservoirs, gages arranged movably across the said reservoirs above the gate, and arms on the gate actuating the gages.

6. In combination with the cartridge-receiver, ball-reservoirs above said receiver and disposed at opposite sides of and equidistant from the axial line of the receiver, a ball-transferrer arranged movably laterally between said receiver and reservoirs, a gate arranged movably across the bases of the reservoirs, springs attached to the exteriors of the reservoirs, gages attached to said springs and projecting laterally into the reservoirs, arms on the aforesaid gate engaging the said springs, and lugs on the ball-transferrer engaging the gate, substantially as described and shown.

7. The combination of the ball-reservoir provided with a longitudinal slot, a gate across the base of said reservoir, a spring attached to the exterior of the reservoir adjustably longitudinally thereon, a gage attached to said spring and projecting through the aforesaid slot, and an arm attached to the gate and engaging the spring, substantially as described and shown.

8. In combination with the cartridge-receiver, a powder-and-ball transferrer pivoted to the front of the top of the said receiver and provided with two vertical passages equidistant from its pivot, two ball-reservoirs arranged over the transferrer at opposite sides of the axial line of the cartridge-receiver and equidistant from the pivot of the transferrer, a powder-duct between the ball-reservoirs and in range with the line of travel of the transferrer, a gate arranged movably across the bases of the ball-reservoirs, gages arranged movably across the said reservoirs above the gate, lugs on the transferrer engaging the gate, and arms on the gate operating the gages, substantially as described and shown.

9. The combination of the frame A, provided with the cartridge-receiver C and formed with the duct P', and vertical web A', having transversely through it the ports $f$ and $g$, the powder-gage M', pivoted to one side of the said web, and the powder-reservoir M, adapted to communicate alternately with the aforesaid ports, substantially as described and shown.

10. The frame formed with a vertical sleeve provided with a lateral ammunition-duct, a tube secured in said sleeve and provided with a lateral coinciding ammunition-duct and formed below the sleeve with a horizontal opening toward the front and with horizontal projections above and below said opening, vertical perforations in the upper projection, tubular reservoirs inserted into the upper ends of said perforation, a horizontal gate pivoted to the said projection between the perforations thereof and movable into and out of the perforations, a ball-transferrer in the horizontal opening of the aforesaid tube and pivoted to the upper projection thereof and provided with vertical channels, lugs on said transferer engaging the gate, and the cartridge-receiver attached to the lower end of the tube, substantially as described and shown.

In testimony whereof I have hereunto signed my name this 11th day of March, 1889.

EDWARD G. DORCHESTER. [L. S.]

Witnesses:
S. SOUTHWORTH,
FRED G. NARES.